United States Patent
Gupta et al.

(10) Patent No.: US 10,798,125 B2
(45) Date of Patent: Oct. 6, 2020

(54) SYSTEM AND METHOD FOR NETWORK ENTITY ASSISTED HONEYPOT ACCESS POINT DETECTION

(71) Applicant: RELIANCE JIO INFOCOMM LIMITED, Mumbai (IN)

(72) Inventors: Ajay Kumar Gupta, Pune (IN); Vishal Vasant Oak, Bangalore (IN); Parwiz Shekalim, Navi Mumbai (IN); Tareq Amin, Navi Mumbai (IN)

(73) Assignee: RELIANCE JIO INFOCOMM LIMITED, Mumbai (IN)

(*) Notice: Subject to any disclaimer, the term of this patent is extended or adjusted under 35 U.S.C. 154(b) by 212 days.

(21) Appl. No.: 15/791,287

(22) Filed: Oct. 23, 2017

(65) Prior Publication Data
US 2018/0124111 A1 May 3, 2018

(30) Foreign Application Priority Data
Oct. 27, 2016 (IN) .............................. 201621036954

(51) Int. Cl.
*H04L 29/06* (2006.01)
*H04W 12/06* (2009.01)
*H04W 12/08* (2009.01)
*H04W 12/12* (2009.01)

(52) U.S. Cl.
CPC ...... *H04L 63/1466* (2013.01); *H04L 63/0876* (2013.01); *H04L 63/1491* (2013.01); *H04W 12/06* (2013.01); *H04W 12/1202* (2019.01); *H04L 63/101* (2013.01)

(58) Field of Classification Search
CPC .. H04W 48/00; H04W 12/06; H04L 63/1491; H04L 63/10; H04L 63/101
See application file for complete search history.

(56) References Cited

U.S. PATENT DOCUMENTS

| | | | |
|---|---|---|---|
| 7,181,530 B1* | 2/2007 | Halasz | H04L 63/0869 709/228 |
| 2007/0180244 A1* | 8/2007 | Halasz | H04L 63/0869 713/168 |
| 2007/0298720 A1* | 12/2007 | Wolman | H04L 63/1408 455/66.1 |

(Continued)

FOREIGN PATENT DOCUMENTS

| | | | | |
|---|---|---|---|---|
| EP | 2372971 A1 * | 10/2011 | ........... | H04L 63/101 |
| WO | WO-2015084152 A1 * | 6/2015 | ............. | H04L 63/18 |
| WO | WO-2017128546 A1 * | 8/2017 | ........ | H04W 12/1202 |

*Primary Examiner* — Mohammad A Siddiqi
(74) *Attorney, Agent, or Firm* — Ladas & Parry, LLP (57) ABSTRACT

Embodiments of the present invention relate to a network entity assisted system and method for detection of Honeypot access point. More particularly, the embodiments may disclose a method for authenticating the access point based on a request from a user equipment; the method comprising: comparing an AP identifier with a pre-configured list of AP identifiers to generate one of a positive response and a negative response; transmitting one of a denial response and a verification request; receiving one of a positive verification response and a negative verification response from the authorized AP; transmitting one of a positive authentication response and negative authentication response to maintain the connection with the authorized AP and release the connection with Honeypot AP, respectively.

12 Claims, 6 Drawing Sheets

(56) References Cited

U.S. PATENT DOCUMENTS

| | | | |
|---|---|---|---|
| 2013/0019298 A1* | 1/2013 | Jover Segura | H04L 63/101 |
| | | | 726/7 |
| 2014/0050320 A1* | 2/2014 | Choyi | H04L 63/08 |
| | | | 380/270 |
| 2017/0201878 A1* | 7/2017 | Yu | H04L 9/3268 |
| 2017/0215132 A1* | 7/2017 | Moisanen | H04B 7/0613 |
| 2017/0366978 A1* | 12/2017 | Ahmadzadeh | H04L 63/1466 |

\* cited by examiner

SYSTEM AND METHOD FOR NETWORK ENTITY ASSISTED HONEYPOT ACCESS POINT DETECTION

CROSS REFERENCE TO RELATED APPLICATION

This application claims the benefit of and priority to Indian Patent Application No: 201621036954 filed on Oct. 27, 2016, the disclosure of which is hereby incorporated herein by reference in its entirety.

TECHNICAL FIELD

Embodiments of the present invention generally relate to communication systems. In particular, embodiments of the present invention relate to a system and a method for detecting a honeypot access point using a network entity-assisted authentication.

BACKGROUND

In the current scenario, a user enjoys data services such as internet through a cellular network provided by a cellular operator or through an access point. The access point deployed for the user can be one of an authorized access point and a honeypot access point. The authorized access point is a legitimate access point that provides the data services to the user and is deployed by the cellular operator or other authorized service providers. On the contrary, the honeypot access point is an illegitimate access point that appears to be an authorized access point to the user, advertises similar data services to the user and are deployed by an attacker with malicious intent. In a different scenario, it is also possible that the attacker may masquerade the honeypot access point as the authorized access point by broadcasting same configuration settings (including SSID and password) as of the authorized access point. In this scenario, the user establishes a connection with the honeypot access point for availing data services, assuming that the connection is established with the authorized access point.

Moreover, for the convenience of the user, most of the access points (including the authorized access point and the honeypot access point) use open configuration for establishing connection with the user i.e. the access points do not provide any authentication and security services to the user. Although convenient, but the open configuration easily exposes the user to man-in-the-middle attacks causing serious security implications for the user. The man-in-the-middle attack is typically launched by setting up the honeypot access point in the vicinity of openly configured hotspot deployment that advertises the similar configuration settings as of the authorized access point. After the honeypot access point starts functioning, the honeypot access point easily lures the user seeking to establish a connection for availing the data service. Once connected to the honeypot access point, the user may become vulnerable to a variety of layer 3 attacks by the attacker who has deployed the honeypot access point. Such layer 3 attacks cause serious security implications for the affected user by means of loss of confidential data, malware implantation, etc.

Existing known solutions for detecting the honeypot access point are available and one of the solutions relies on periodic scanning in the vicinity of the hotspot deployment and collecting the data relevant to the access points operating therein. The periodic collected data is then analysed to identify the access points that do not belong to the cellular operator or other authorized service providers (by comparing the various attributes) and advertising the similar configuration settings as of the authorized access point. Once honeypot access point is detected based on such known solution, the connection to the honeypot access point is interrupted by sending de-authentication frames to the user.

However, the attacker also masquerades the configuration settings and other attributes of the authorized access point while setting up the honeypot access point and thereby becomes difficult for the existing known solutions to effectively detect the honeypot access point. Moreover, existing known solutions are dependent on scanning procedures that are either be dedicated or multiplexed over the wireless service. Further, the dedicated scanning procedure is either integrated with access points or separately available in form of WiFi sensor units installed in the hotspot vicinity. But, the provision of scanning procedures adds to the overall cost of the hotspot deployment and multiplexed scanning process introduces greater latency in the honeypot access point detection process.

Such existing known solutions for detecting the honeypot access point and preventing the attacks from the honeypot access point, would require a separate module for the same, either in an integrated or standalone way. This additional module further adds to the cost. Also, these existing known solutions detecting the honeypot access point are not effective and efficient.

Therefore, in view of the above shortcomings in the existing known solutions, there is a need for an efficient and effective approach for detecting the honeypot access point and preventing the user to connect with such access point in the public hotspot deployment.

SUMMARY

This section is provided to introduce certain aspects of the present invention in a simplified form that are further described below in the detailed description. This summary is not intended to identify the key features or the scope of the claimed subject matter.

Embodiments of the present invention may relate to a method for authenticating an access point, the method being performed by a network entity, the method comprising: receiving an authentication request for authenticating an access point (AP) from a user equipment, wherein the access point is, one of the authorized AP and a honeypot AP, connected with the user equipment, the authentication request comprises a UE identifier, an AP identifier, and at least one parameter, and the UE identifier corresponds to the user equipment and the AP identifier corresponds to one of the authorized AP and the honeypot AP; comparing the AP identifier with a pre-configured list of AP identifiers to generate one of a positive response and a negative response; transmitting one of a denial response and a verification request, wherein the denial response, to release/suspend the connection with the honeypot AP, is transmitted to the user equipment in an event the negative response is generated, and the verification request is transmitted to the authorized AP in an event the positive response is generated; receiving one of a positive verification response and a negative verification response from the authorized AP; transmitting one of a positive authentication response and a negative authentication response to the user equipment, wherein the positive authentication response is transmitted, to maintain the connection with the authorized AP, in response to the positive verification response received from the authorized AP, and the negative authentication response is transmitted, to release/suspend the connection with the honeypot AP, in response to the negative verification response received from the authorized AP.

Embodiments of the present invention may relate to a network entity for authenticating an access point, the network entity comprising: a receiver module configured to: receive an authentication request for authenticating an access point (AP) from a user equipment, wherein the access point is, one of the authorized AP and a honeypot AP, connected with the user equipment, the authentication request comprises a UE identifier, an AP identifier, and at least one parameter, and the UE identifier corresponds to the user equipment and the AP identifier corresponds to one of the authorized AP and the honeypot AP; a processor configured to compare the AP identifier with a pre-configured list of AP identifiers to generate one of a positive response and a negative response; a transmitter module configured to transmit one of a denial response to the user equipment and a verification request to the authorized AP, wherein the denial response is transmitted, to release/suspend the connection with the honeypot AP, in an event the negative response is generated, and the verification request is transmitted in an event the positive response is generated; the receiver module further configured to receive a positive verification response and a negative verification response from the authorized AP; and the transmitter module further configured to transmit one of a positive authentication response and a negative authentication response to the user equipment, wherein the positive authentication response is transmitted to maintain the connection with the authorized AP, and the negative authentication response is transmitted to release/suspend the connection with the honeypot AP.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Also, the embodiments shown in the figures are not to be construed as limiting the invention, but the possible variants of the method and system according to the invention are illustrated herein to highlight the advantages of the invention. It will be appreciated by those skilled in the art that disclosure of such drawings includes disclosure of electrical components or circuitry commonly used to implement such components.

DETAILED DESCRIPTION

In the following description, for the purposes of explanation, various specific details are set forth in order to provide a thorough understanding of embodiments of the present invention. It will be apparent, however, that embodiments of the present invention may be practiced without these specific details. Several features described hereafter can each be used independently of one another or with any combination of other features. An individual feature may not address any of the problems discussed above or might address only one of the problems discussed above. Some of the problems discussed above might not be fully addressed by any of the features described herein. Example embodiments of the present invention are described below, as illustrated in various drawings in which like reference numerals refer to the same parts throughout the different drawings.

The present invention encompasses a system and a method for authenticating an access point by a network entity based on an authentication request received from a user equipment, wherein the access point comprises one of an authorized access point and a honeypot access point. Further, the system and the method may be configured to allow/authenticate the authorized access point to communicate with the user equipment, whereas the honeypot access point may be barred to make/establish and communicate with the user equipment. More particularly, the present invention encompasses a system and a method for enabling the network entity to prevent the user equipment from maintaining a connection with the honeypot access point, whereas enabling the network entity to indicate the user equipment to maintain the connection with authorized access point.

As used herein, the access point serves a Wi-Fi network to the user equipment using which the user equipment avails data services (such as internet) by a wireless connection established between the user equipment and the access point via the Wi-Fi network.

As used herein, the authorized access point is a legitimate access point that provides the data services to the user equipment and are deployed by a cellular operator or other authorized service providers.

As used herein, the honeypot access point is an illegitimate access point that appears to be the authorized access point to the user equipment, by advertising similar data services to the user equipment but are deployed by an attacker with malicious intent.

As used herein, the network entity is an entity that serves a cellular network for providing voice services (calls) and the data services to the user equipment. The network entity may include, but not limited to, a base station controller, a base transceiver station, a cell site, a Node B, an eNode B, a radio network controller, and any such entity obvious to a person skilled in the art.

As used herein, the user equipment is a computing device that is latched to the network entity and thus, receives voice and data services from the network entity. Further, the user equipment may get connected to access point for availing the voice and data services. The user equipment may have a processor, a display, a memory and an input means such as a hard keypad and/or a soft keypad. The user equipment may include, but not limited to, a mobile phone, a tablet, a wearable device, a phablet, a personal digital assistance and any such device obvious to a person skilled in the art.

Figure 1:
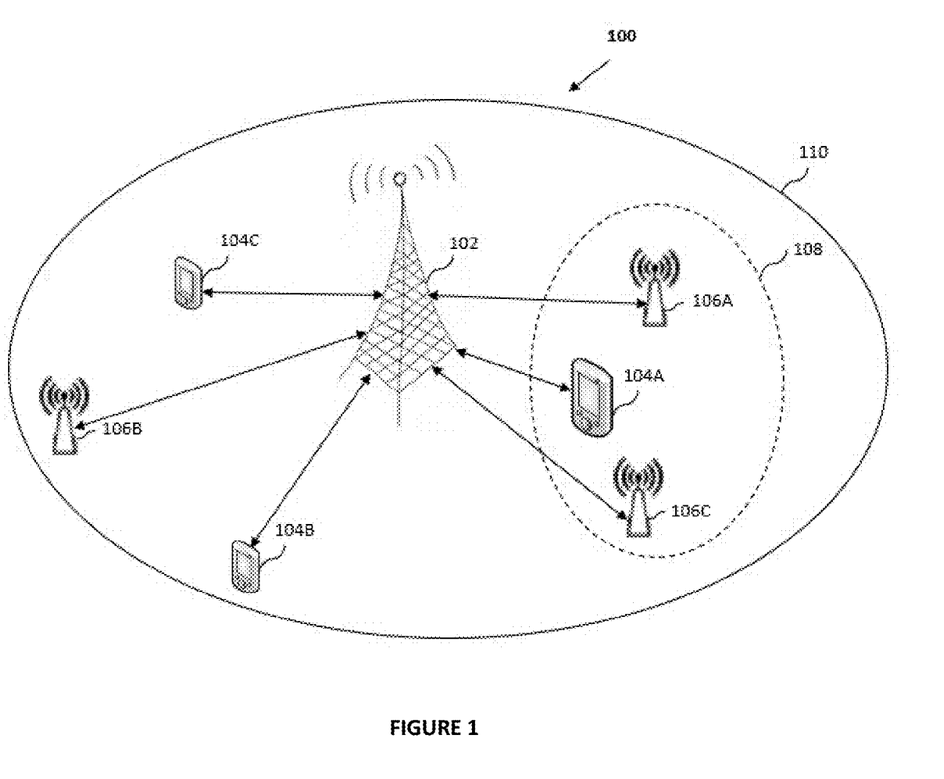
FIG. 1 illustrates an exemplary system architecture [100] for authenticating an access point, in accordance with an embodiment of the present disclosure.

As illustrated in FIG. 1, the present invention illustrates an exemplary system architecture [100] for authenticating an access point, in accordance with an embodiment of the present disclosure, depicting: a network entity [102] with a cellular coverage range [110], one or more user equipments [104A-104C] present in the cellular coverage range [110], a set of access points [106A-106C], wherein the access points [106A, 106C] provides a WiFi coverage range [108] to the one or more user equipments [104A-104C].

The network entity [102] may provide a cellular network to the one or more user equipments [104A-104C] present in the cellular coverage range [110] of the network entity [102] and thereby, the one or more user equipments [104A-104C] may avail voice and data services using the cellular network. Further, the set of access points [106A-106C] may be deployed by one of an attacker or an authorized services provider to provide a WiFi network to the one or more user equipments [104A-104C] present in the WiFi coverage range [108] for availing the voice and data services. Considering the exemplary system architecture [100], at least one user equipment [104A] present in the cellular coverage range [110] provided by the network entity [102] may avail the voice and data services through one of the cellular network and the WiFi network. Further, the at least one user equipment [104A] may establish a WiFi connection to one of an authorized access point [106A] and a honeypot access point [106C] by transmitting a connection request to one of the authorized access point [106A] and the honeypot access point [106C]. In an embodiment, the connection request may be a radio resource control (RRC) request. Also, the at least one user equipment [104A] may transmit a user equipment (UE) identifier and at least one parameter to one of the authorized access point [106A] and the honeypot access point [106C]. In such exemplary system architecture [100], there may exist two different scenarios, a first exemplary scenario may be a scenario when the at least one user equipment [104A] may transmit the connection request, the UE identifier and the at least one parameter to the authorized access point [106A] and a second exemplary scenario when the at least one user equipment [104A] may transmit the connection request, the UE identifier and the at least one parameter to the honeypot access point [106C].

The at least one parameter may include at least one of a probe request identifier, an authentication request identifier, an association request identifier and a temporary user equipment identifier. In an embodiment, the connection request may include the UE identifier and the at least one parameter. In other embodiment, the UE identifier and the at least one parameter may be transmitted after the connection request. In another embodiment, the UE identifier and the at least one parameter may be transmitted before the connection request.

After receiving the connection request, the UE identifier and the at least one parameter, one of the authorized access point [106A] and the honeypot access point [106C] may store the UE identifier and the at least one parameter in a memory. Similarly, the at least one user equipment [104A] may store an access point (AP) identifier in a memory, wherein the AP identifier corresponds to one of the authorized access point [106A] and the honeypot access point [106C] and to which the connection request has been sent. For an instance, with regard to the first exemplary scenario, the authorized access point [106A] may store the UE identifier and the at least one parameter received from the at least one user equipment [104A]. Further, the at least one user equipment [104A] may store the AP identifier of the authorized access point [106A]. Similarly, with regard to the second exemplary scenario, the honeypot access point [106C] may store the UE identifier and the at least one parameter received from the at least one user equipment [104A]. Also, the at least one user equipment [104A] may store the AP identifier of the honeypot access point [106C].

Then, the at least one user equipment [104A] may transmit an authentication request to the network entity [102] for authenticating one of the authorized access point [106A] and the honeypot access point [106C]. The at least one user equipment [104A] may further transmit the AP identifier, the UE identifier and the at least one parameter to the network entity [102]. Following the same instance, with regard to the first exemplary scenario, the at least one user equipment [104A] may transmit the authentication request to the network entity [102] for authenticating the authorized access point [106A] along with the UE identifier, the at least one parameter and the AP identifier of the authorized access point [106A]. Similarly, with regard to the second exemplary scenario, the at least one user equipment [104A] may transmit the authentication request to the network entity [102] for authenticating the honeypot access point [106C] along with the UE identifier, the at least one parameter and the AP identifier of the honeypot access point [106C].

In an embodiment, the authentication request may include AP identifier, the UE identifier and the at least one parameter. In another embodiment, the AP identifier, the UE identifier and the at least one parameter may be transmitted after the authentication request. In another embodiment, the AP identifier, the UE identifier and the at least one parameter may be transmitted before the authentication request.

On receiving the authentication request, the network entity [102] may store the at least one parameter, the UE identifier and the AP identifier in a memory of the network entity [102]. Further, the network entity [102] may compare the AP identifier with a pre-configured list of AP identifiers, wherein pre-configured list of AP identifiers may be the identifiers of nearby access points deployed in the cellular coverage range [110] or may be configured in a prior communication between the nearby access points and the network entity [102]. Based on the comparison, the network entity [102] may generate one of a positive response and a negative response. The positive response may be generated by the network entity [102] in an event the network entity [102] may identify a match of the AP identifier with the pre-configured list of AP identifiers. Alternatively, the negative response may be generated by the network entity [102] in an event the network entity [102] may not identify the match of the AP identifier with the pre-configured list of AP identifiers. In an event, the positive response is generated, the network entity [102] may transmit a verification request to the authorized access point [106A]. In an event, the negative response is generated, the network entity [102] may transmit a denial response to the at least one user equipment [104A]. When the least one user equipment [104A] receives the denial response the network entity [102], the least one user equipment [104A] may terminate the connection request.

In an embodiment, the verification request may include the UE identifier and the at least one parameter. In other embodiment, the UE identifier and the at least one parameter may be transmitted after the verification request. In another embodiment, the UE identifier and the at least one parameter may be transmitted before the verification request.

Following the same example, with regard to the first exemplary scenario, the network entity [102] may compare the received AP identifier of the authorized access point [106A] with the pre-configured list of AP identifiers. Based on the comparison, the network entity [102] may generate the positive response as the network entity [102] may identify the match of the AP identifier of the authorized access point [106A] with the pre-configured list of AP identifiers. Alternatively, the negative response may be generated by the network entity [102] in an event the network entity [102] may not identify the match. In an event, the positive response is generated, the network entity [102] may transmit the verification request to the authorized access point [106A] including the UE identifier and the at least one parameter. Similarly, with regard to the second exemplary scenario, the network entity [102] may compare the received AP identifier of the honeypot access point [106C] with the pre-configured list of AP identifiers. However, with respect to this second exemplary scenario, the network entity [102] may not identify any match between the received AP identifier of the honeypot access point [106C] with the pre-configured list of AP identifiers since the network entity [102] may never store the AP identifier of the honeypot access point [106C]. Further, the network entity [102] may never communicate with the honeypot access point [106C] due to the already known malicious intent of the honeypot access point [106C]. Thereby, the network entity [102] may transmit the verification request only to the authorized access point [106A].

After the authorized access point [106A] receives the verification request from the network entity [102], the authorized access point [106A] may compare the UE identifier and the at least one parameter received from the network entity [102] with the UE identifier and the at least one parameter stored in the memory. Based on the comparison, the authorized access point [106A] may generate one of a positive verification response and a negative verification response. The positive verification response may be generated by the authorized access point [106A] in an event the authorized access point [106A] may identify a match of the UE identifier and the at least one parameter with the UE identifier and the at least one parameter stored in the memory. Alternatively, the negative verification response may be generated by the authorized access point [106A] in an event one of the authorized access point [106A] may not identify the match of the UE identifier and the at least one parameter with the UE identifier and the at least one parameter stored in the memory. In an event, the positive verification response is generated by the authorized access point [106A] and transmitted to the network entity [102], the network entity [102] may transmit a positive authentication response to the at least one user equipment [104A]. In an event, the negative verification response is generated by the authorized access point [106A] and transmitted to the network entity [102], the network entity [102] may transmit a negative authentication response to the at least one user equipment [104A]. The positive authentication response may indicate the at least one user equipment [104A] to maintain the connection with the authorized access point [106A] whereas the negative authentication response may indicate the at least one user equipment [104A] to release/suspend the connection with the honeypot access point [106C].

Considering the same example, with regard to the first exemplary scenario, the authorized access point [106A] may compare the UE identifier and the at least one parameter received from the network entity [102] with the stored UE identifier and the at least one parameter and may found a match, with regard to the first exemplary scenario. Based on this comparison, the authorized access point [106A] transmit the positive verification response to the network entity [102] as the authorized access point [106A] identifies the match of the UE identifier and the at least one parameter with the stored UE identifier and the at least one parameter. Further, the network entity [102] may transmit the positive authentication response to the at least one user equipment [104A] when the positive verification response is received from the authorized access point [106A]. Thereby, the at least one user equipment [104A] maintains the connection with the authorized access point [106A]. With regard to the second exemplary scenario, the honeypot access point [106C] does not send any positive verification response or the negative verification response to the network entity [102] as the honeypot access point [106C] does not have the capability to verify the at least one user equipment [104A]. Moreover, in such second exemplary scenario, the network entity [102] transmit the negative authentication response to the at least one user equipment [104A] when the negative verification response is received from the authorized access point [106A] based on the comparison of the UE identifier and the at least one parameter received from the network entity [102] with the stored UE identifier and the at least one parameter. Thereby, the at least one user equipment [104A] may release/suspend the connection with the honeypot access point [106C].

Figure 2:
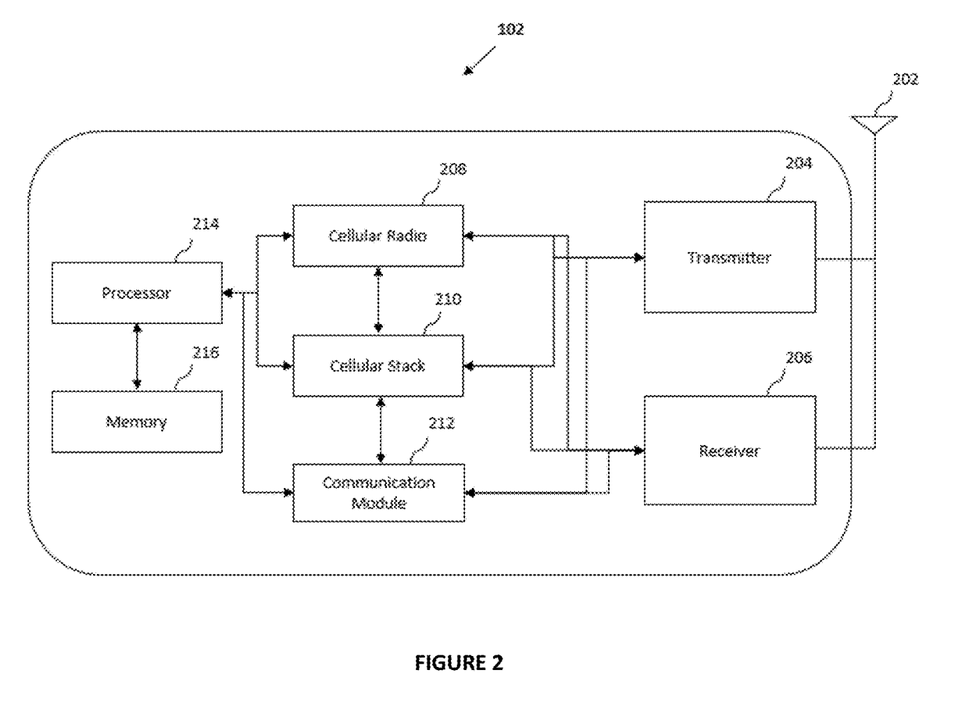
FIG. 2 illustrates a network entity [102] for authenticating an access point, in accordance with an exemplary embodiment of the present disclosure.

As illustrated in FIG. 2, the present invention illustrates a network entity [102] for authenticating an access point, in accordance with an exemplary embodiment of the present disclosure, the network entity [102] comprising: an antenna [202], a transmitter [204], a receiver [206], a cellular radio [208], a cellular stack [210], a communication module [212], a processor [214] and a memory [216].

The antenna [202] coupled with the transmitter module [204] and the receiver module [206] for transmitting and receiving radio signals, respectively, wherein the transmitter module [204] and the receiver module [206] may form parts of the cellular radio [208].

More specifically, the communication module [212] may be configured to transmit the verification request to the authorized access point [106A] via the transmitter module [204]. Further, the cellular stack [212] may be configured to transmit the denial response and the at least one of the positive authentication response and the negative authentication response to the at least one user equipment [104A] via the transmitter module [204]. Further, the communication module [212] may be configured to receive one of the positive verification response and the negative verification response from the authorized access point [106A] via the receiver module [206]. Further, the cellular stack [212] may be configured to receive the authentication request from the at least one user equipment [104A] via the receiver module [206].

The transmitter module [204] and the receiver module [206] may communicate with cellular radio [208], the cellular stack [210], and the communication module [212].

The cellular radio [208], in communication with the cellular stack [210], may be configured to provide one or more cellular functionalities to the one or more equipment [104A-104C]. Such cellular functionalities may include, but not limited to, resources allocation, the data services and the voice services. The cellular radio [208], in communication with the cellular stack [210], may be further configured to communicate with the one or more equipment [104A-104C] through the transmitter [204] and the receiver [206].

The communication module [212] may be configured communicate with the set of access points [106A-106C] through the transmitter [204] and the receiver [206]. Such communication may include receiving the positive verification response and the negative verification response from at least one of the authorized access point [106A] and the honeypot access point [106C], and transmitting the verification request to the authorized access point [106A].

The processor [214] may communicate with the cellular radio [208], the cellular stack [210], and the communication module [212] and may be configured to perform operations such as comparing the received AP identifier of the access point with the pre-configured list of AP identifiers, by the data stored in the memory [216]. The processor [214] as used herein may include, but is not limited to, a processor or set of processors such as a microprocessor, a multi-core microprocessor, a digital signal processor, a collection of electronic circuits, or a combination thereof and may be configured to perform operations/functions as described herein.

The memory [216], coupled to the processor [214], may be configured to store and manage multiple data sets including the UE identifier, the AP identifier, the at least one parameter, the nearby access points identifiers etc. The memory [216] may include, but is not limited to, a volatile memory, non-volatile memory, a remote storage, a cloud storage, high-speed random-access memory and/or non-volatile memory, such as one or more magnetic disk storage devices, one or more optical storage devices, and/or flash memory (e.g., NAND, NOR) or a combination thereof.

Figure 3:
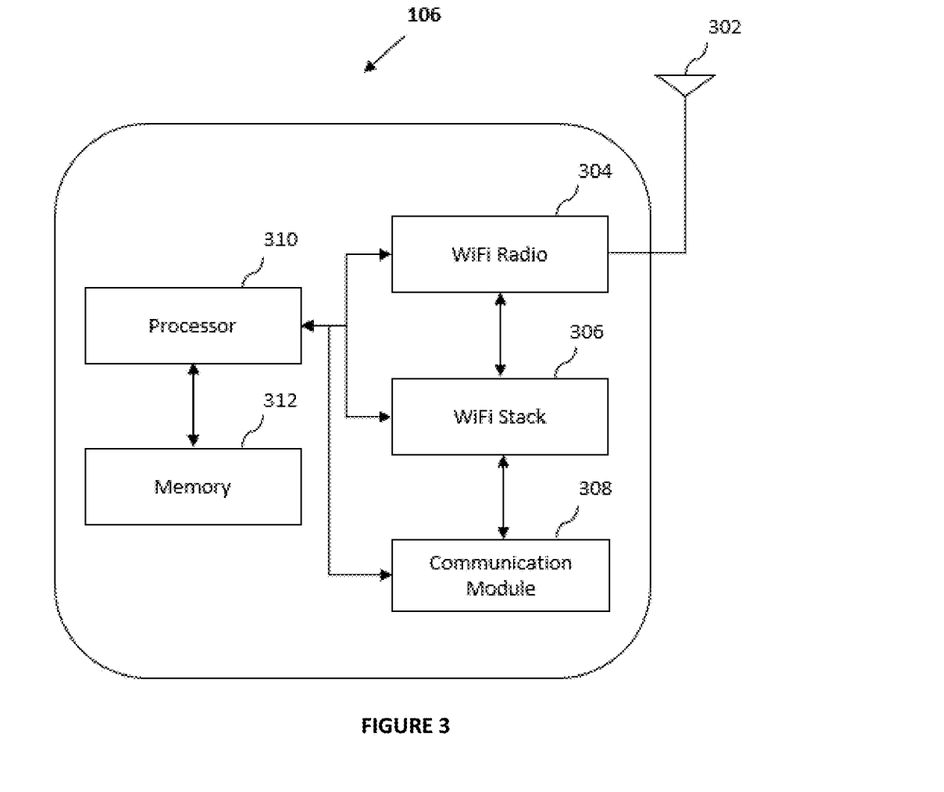
FIG. 3 illustrates an access point [106], in accordance with an exemplary embodiment of the present disclosure.

As illustrated in FIG. 3, the present invention illustrates an access point [106], in accordance with an exemplary embodiment of the present disclosure, the access point [106] comprising: an antenna [302], a WiFi radio [304], a WiFi stack [306], a communication module [308], a processor [310] and a memory [312]. The exemplary access point [106] includes at least one of the authorized access point [106A] and the honeypot access point [106C].

The antenna [302] may be configured to transmit wireless (WiFi) signals to the one or more user equipment [104A-104C] and may be further configured to communicate with the network entity [102] and the one or more user equipment [104A-104C]. The antenna [302] may be further communicate with the WiFi radio [304].

The WiFi radio [304], in communication with the WiFi stack [306], may be configured to provide wireless services to the one or more equipment [104A-104C] through the antenna [302]. Such wireless services may include, but not limited to, resources allocation, the data services and the voice services. The WiFi radio [304], in communication with the WiFi stack [306], may be further configured to communicate with the one or more equipment [104A-104C] through the antenna [302]. Such communication may include receiving the connection request, the UE identifier, and the at least one parameter from the at least one user equipment [104A] and providing the data services and the voice services to the at least one user equipment [104A].

The communication module [308] may be configured to communicate with the network entity [102]. Such communication may include transmitting the positive verification response and the negative verification response to the network entity [102], and receiving the verification request from the network entity [102].

The processor [310] may communicate with the WiFi radio [304], the WiFi stack [306], and the communication module [308] and may be configured to perform operations such as comparing the received UE identifier and the at least one parameter of the at least one user equipment [104A] with the stored UE identifier and the at least one parameter, by referring to the data stored in the memory [312]. The processor [310] as used herein may include, but is not limited to, a processor or set of processors such as a microprocessor, a multi-core microprocessor, a digital signal processor, a collection of electronic circuits, or a combination thereof and may be configured to perform operations/functions as described herein.

The memory [312], coupled to the processor [310], may be configured to store and manage multiple data sets including the UE identifier, the at least one parameter, a network entity identifier, current connections information etc. The memory [312] may include, but is not limited to, a volatile memory, non-volatile memory, a remote storage, a cloud storage, high-speed random-access memory and/or non-volatile memory, such as one or more magnetic disk storage devices, one or more optical storage devices, and/or flash memory (e.g., NAND, NOR) or a combination thereof.

Figure 4:
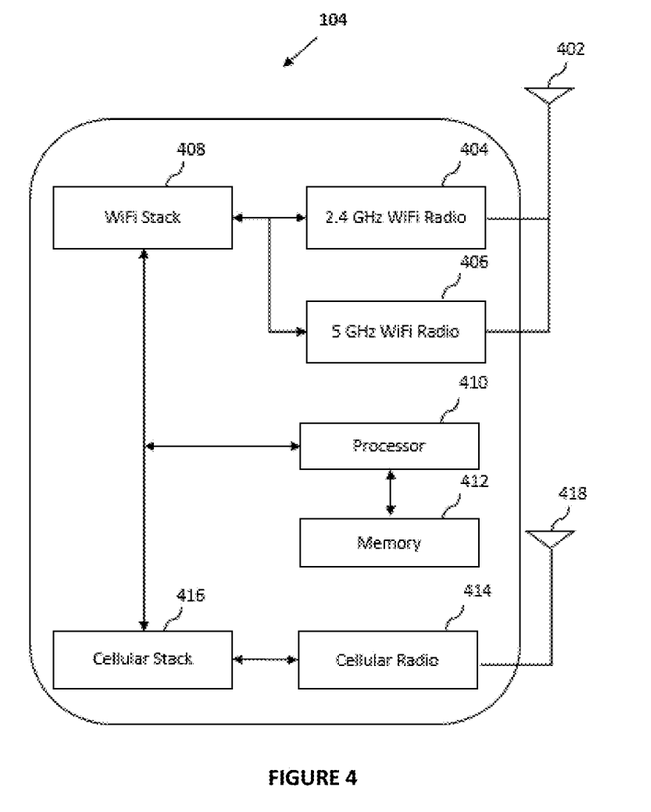
FIG. 4 illustrates a user equipment [104], in accordance with an exemplary embodiment of the present disclosure.

As illustrated in FIG. 4, the present invention illustrates a user equipment [104], in accordance with an exemplary embodiment of the present disclosure, the user equipment [104] comprising: an antenna [402], a WiFi stack [408] connected with a 2.4 GHz WiFi radio [404] and a 5 GHz WiFi radio [406], a processor [410] and a memory [412], a cellular radio [414], and a cellular stack [416].

The antenna [402] may be configured to receive radio signals from the network entity [102] and the WiFi signals from the access point [106]. The antenna [402] may be further communicate with 2.4 GHz WiFi radio [404], the 5 GHz WiFi radio [406], and the cellular radio [414].

The WiFi stack [408] connected with the 2.4 GHz WiFi radio [404] and the 5 GHz WiFi radio [406], may be configured to communicate with the set of access point [106A-C] for receiving the wireless services, through the antenna [402], from the set of access point [106A-106C]. Such communication may include transmitting the connection request to the at least one access point [106A-106C] and receiving wireless services from the at least one access point [106A-106C] through the antenna [402].

The cellular radio [414], in communication with the cellular stack [416], may be configured to receive the cellular network from the network entity [102]. The cellular radio [414], in communication with the cellular stack [416], may be further configured to communicate with the one or more equipment [104A-104C] through the antenna [402]. Such communication may include transmitting the authentication request to the network entity [102], and receiving the denial response request, the positive authentication response and the negative authentication response from the network entity [102].

The processor [410] may communicate with the WiFi stack [408] and the cellular stack [416] and may be configured to perform operations by referring to the data stored in the memory [216]. The processor [214] as used herein may include, but is not limited to, a processor or set of processors such as a microprocessor, a multi-core microprocessor, a digital signal processor, a collection of electronic circuits, or a combination thereof and may be configured to perform operations/functions as described herein.

The memory [412], coupled to the processor [410], may be configured to store and manage multiple data sets including the AP identifier, the at least one parameter, the network entity information etc. The memory [412] may include, but is not limited to, a volatile memory, non-volatile memory, a remote storage, a cloud storage, high-speed random-access memory and/or non-volatile memory, such as one or more magnetic disk storage devices, one or more optical storage devices, and/or flash memory (e.g., NAND, NOR) or a combination thereof.

Figure 5:
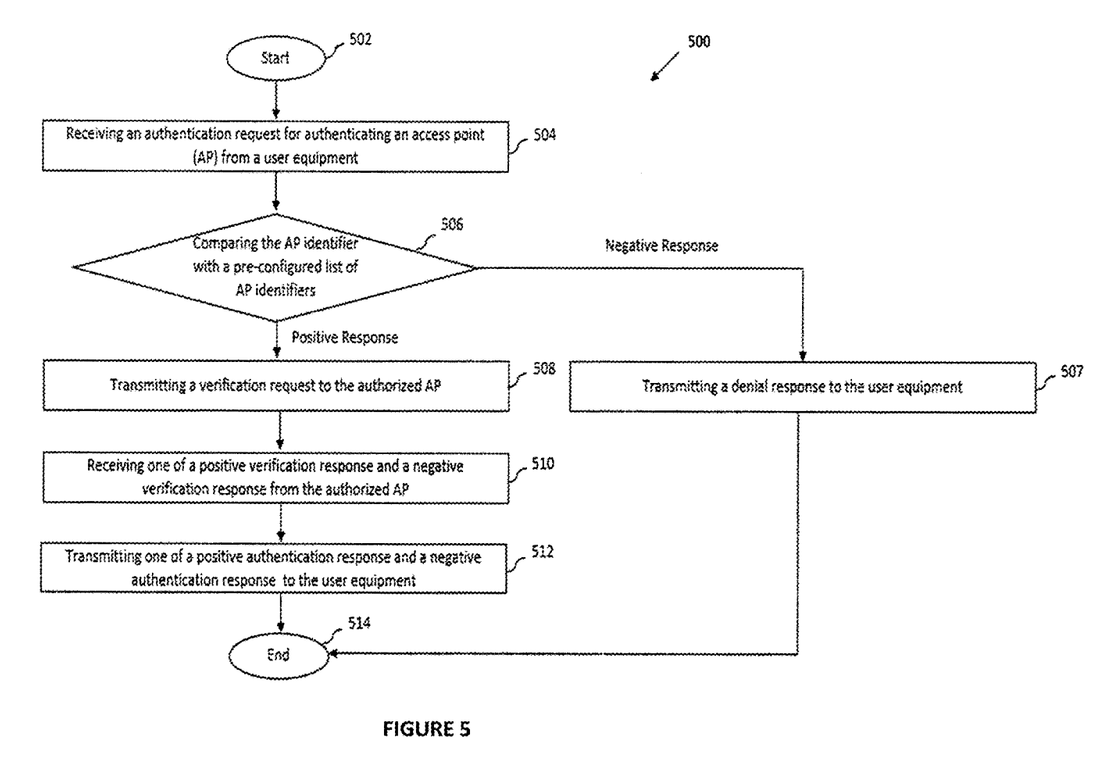
FIG. 5 illustrates an exemplary method flow diagram [500] for authenticating an access point, in accordance with an embodiment of the present invention.

As illustrated in FIG. 5, the present invention illustrates an exemplary method flow diagram [500] for authenticating an access point, in accordance with an embodiment of the present invention, wherein the method being performed by the network entity [102]. The method flow initiates at step 502.

At step 504, the method flow diagram [500] may receive an authentication request from the at least one user device [104A] for authenticating one of the authorized access point [106A] and the honeypot access point [106C]. The method flow diagram [500] may further receive, from the at least one user equipment [104A], the AP identifier, the UE identifier and the at least one parameter. Following the same instance, with regard to the first exemplary scenario, the network entity [102] may receive the authentication request from the at least one user equipment [104A] for authenticating the authorized access point [106A] along with the UE identifier, the at least one parameter and the AP identifier of the authorized access point [106A]. Similarly, with regard to the second exemplary scenario, the network entity [102] may receive the authentication request from the at least one user equipment [104A] for authenticating the honeypot access point [106C] along with the UE identifier, the at least one parameter and the AP identifier of the honeypot access point [106C]. Prior to receiving the authentication request, the at least one user equipment [104A] may transmit the connection request along with the UE identifier and the at least one parameter to one of the authorized access point [106A] and the honeypot access point [106C].

At step 506, the method flow diagram [500] may store the UE identifier and the at least one parameter in the memory [312]. Further, the method flow diagram [500] may compare the AP identifier with the pre-configured list of AP identifiers, wherein pre-configured list of AP identifiers may be the identifiers of the nearby access points deployed in the cellular coverage range [110] or may be configured in the prior communication between the nearby access points and the network entity [102]. The method flow diagram [500] may, generate the positive response may be generated by the method flow diagram [500] in an event the method flow diagram [500] may identify a match of the AP identifier with the pre-configured list of AP identifiers. Further, the method flow diagram [500] may, based on the comparison, generate the negative response in an event the method flow diagram [500] may not identify the match of the AP identifier with the pre-configured list of AP identifiers. Following the same example, with regard to the first exemplary scenario, the network entity [102] may compare the received AP identifier of the authorized access point [106A] with the pre-configured list of AP identifiers. Based on the comparison, the network entity [102] may generate the positive response as the network entity [102] may identify the match of the AP identifier of the authorized access point [106A] with the pre-configured list of AP identifiers. Alternatively, the negative response may be generated by the network entity [102] in an event the network entity [102] may not identify the match. Similarly, with regard to the second exemplary scenario, the network entity [102] may compare the received AP identifier of the honeypot access point [106C] with the pre-configured list of AP identifiers. Based on the comparison, the network entity [102] may generate the positive response as the network entity [102] may identify the match of the AP identifier of the honeypot access point [106C] with the pre-configured list of AP identifiers. Alternatively, the negative response may be generated by the network entity [102] in an event the network entity [102] may not identify the match.

At step 507, in an event, the negative response is generated, the method flow diagram [500] may transmit the denial response to the at least one user equipment [104A].

At step 508, in an event, the positive response is generated, the method flow diagram [500] may transmit the verification request to the authorized access point [106A].

At step 510, the method flow diagram [500] may receive one of the positive verification response and the negative verification response generated by the authorized access point [106A]. The positive verification response may be generated by the authorized access point [106A] in an event the authorized access point [106A] may identify a match of the UE identifier and the at least one parameter with the UE identifier and the at least one parameter stored in the memory [312]. Alternatively, the negative verification response may be generated by the authorized access point [106A] in an event one of the authorized access point [106A] may not identify the match of the UE identifier and the at least one parameter with the UE identifier and the at least one parameter stored in the memory [312].

At step 512, the method flow diagram [500] may transmit the positive authentication response to the at least one user equipment [104A] in an event, the positive verification response is received by the method flow diagram [500] from the authorized access point [106A]. Alternatively, the method flow diagram [500] may transmit the negative authentication response to the at least one user equipment [104A] when the negative verification response is received by the method flow diagram [500] from the authorized access point [106A]. The positive authentication response may indicate the at least one user equipment [104A] to maintain the connection with the authorized access point [106A] whereas the negative authentication response may indicate the at least one user equipment [104A] to release/suspend the connection with the honeypot access point [106C]. Considering the same example, with regard to the first exemplary scenario, the authorized access point [106A] may transmit the positive verification response to the network entity [102] as the authorized access point [106A] identifies the match of the UE identifier and the at least one parameter with the stored UE identifier and the at least one parameter. Further, the network entity [102] may transmit the positive authentication response to the at least one user equipment [104A] when the positive verification response is received from the authorized access point [106A]. Thereby, the at least one user equipment [104A] maintains the connection with the authorized access point [106A]. With regard to the second exemplary scenario, the honeypot access point [106C] does not send the any positive verification response or the negative verification response to the network entity [102] as the network entity [102] may never communicate with the honeypot access point [106C] due to the already known malicious intent of the honeypot access point [106C]. Moreover, in such second exemplary scenario, the network entity [102] transmit the negative authentication response to the at least one user equipment [104A] when the negative verification response is received from the authorized access point [106A] based on the comparison of the UE identifier and the at least one parameter received from the network entity [102] with the stored UE identifier and the at least one parameter. Thereby, the at least one user equipment [104A] may release/suspend the connection with the honeypot access point [106C]. Then, the method [500] may end at step 514.

Figure 6:
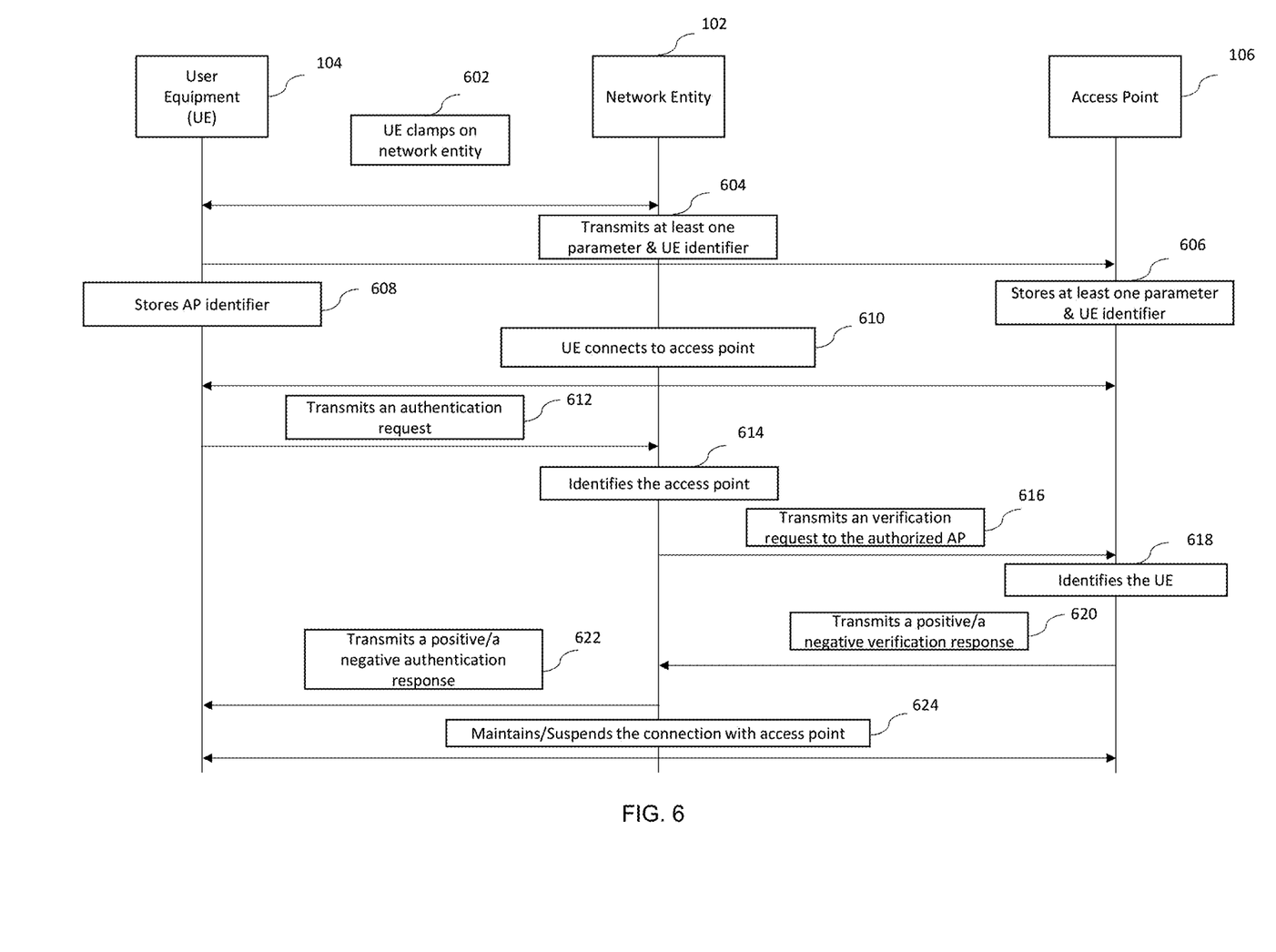
FIG. 6 illustrates an exemplary signaling flow diagram [600] for authenticating an access point, in accordance with an embodiment of the present disclosure.

As illustrated in FIG. 6, the present invention illustrates an exemplary signaling flow diagram [600] for authenticating an access point, in accordance with an embodiment of the present disclosure.

At step 602, the at least one user equipment [104A] may clamp or latched to the network entity [102] and thereby, receives the cellular network from the network entity [102].

At step 604, the at least one user equipment [104A] may establish the WiFi connection to one of the authorized access point [106A] and the honeypot access point [106C] by transmitting the connection request to one of the authorized access point [106A] and the honeypot access point [106C]. Also, the at least one user equipment [104A] may transmit the UE identifier and the at least one parameter to one of the authorized access point [106A] and the honeypot access point [106C].

At step 606, one of the authorized access point [106A] and the honeypot access point [106C] may store the UE identifier and the at least one parameter received from the at least one user equipment [104A] in the memory [312].

At step 608, the at least one user equipment [104A] in the memory [312] may store the AP identifier in the memory [412].

At step 610, the at least one user equipment [104A] may receive the wireless network from one of the authorized access point [106A] and the honeypot access point [106C].

At step 612, the at least one user equipment [104A] may transmit the authentication request to the network entity [102] for authenticating one of the authorized access point [106A] and the honeypot access point [106C]. The at least one user equipment [104A] may further transmit the AP identifier, the UE identifier and the at least one parameter to the network entity [102].

At step 614, on receiving the authentication request, the network entity [102] may store the at least one parameter in the memory [216] and may compare the AP identifier with the pre-configured list of AP identifiers. Based on the comparison, the network entity [102] may generate one of the positive response and the negative response. The positive response may be generated by the network entity [102] in an event the network entity [102] may identify the match of the AP identifier with the pre-configured list of AP identifiers. Alternatively, the negative response may be generated by the network entity [102] in an event the network entity [102] may not identify the match of the AP identifier with the pre-configured list of AP identifiers. In an event, the negative response is generated, the network entity [102] may transmit the denial response to the at least one user equipment [104A].

At step 616, in an event, the positive response is generated, the network entity [102] may transmit the verification request to the authorized access point [106A].

At step 618, after the authorized access point [106A] receives the verification request from the network entity [102], the authorized access point [106A] may compare the UE identifier and the at least one parameter received from the network entity [102] with the UE identifier and the at least one parameter stored in the memory [312].

At step 620, based on the comparison, the authorized access point [106A] may generate one of the positive verification response and the negative verification response. The positive verification response may be generated by the authorized access point [106A] in an event the authorized access point [106A] may identify the match of the UE identifier and the at least one parameter with the UE identifier and the at least one parameter stored in the memory [312]. Alternatively, the negative verification response may be generated by the authorized access point [106A] in an event one of the authorized access point [106A] may not identify the match of the UE identifier and the at least one parameter with the UE identifier and the at least one parameter stored in the memory [312].

At step 622, in an event, the positive verification response is generated by the authorized access point [106A] and transmitted to the network entity [102], the network entity [102] may transmit the positive authentication response to the at least one user equipment [104A]. In an event, the negative verification response is generated by the authorized access point [106A] and transmitted to the network entity [102], the network entity [102] may transmit the negative authentication response to the at least one user equipment [104A].

At step 622, the positive authentication response may indicate the at least one user equipment [104A] to maintain the connection with the authorized access point [106A] whereas the negative authentication response may indicate the at least one user equipment [104A] to release/suspend the connection with the honeypot access point [106C].

Although, the present disclosure has been described with respect to the exemplary system architecture [100] including the first exemplary scenario where the at least one user equipment [104A] may transmit the connection request, the UE identifier and the at least one parameter to the authorized access point [106A] and the second exemplary scenario where the at least one user equipment [104A] may transmit the connection request, the UE identifier and the at least one parameter to the honeypot access point [106C]; however, it will be appreciated by those skilled in the art that the present invention encompasses any access point to act as the authorized access point or the honeypot access point and all such scenarios and embodiments shall be encompassed by the present disclosure.

The units, interfaces, modules, and components depicted in the figures and described herein may be present in the form of a hardware, a software and a combination thereof. Connection/s shown between these units/components/modules/interfaces in the exemplary system architecture [100], the network entity [102], the access point [106], and the user equipment [104] are exemplary and any units/components/module/interface in the exemplary system architecture [100], the network entity [102], the access point [106], and the user equipment [104] may interact with each other through various logical links and/or physical links. Further, the units/components/modules/interfaces may be connected in other possible ways.

Though a limited number of the network entity [102] with the cellular coverage range [110], the user equipments [104A-104C] present in the cellular coverage range [110], the access points [106A-106C], the WiFi coverage range [108], units, interfaces, modules and components, have been shown in the figures; however, it will be appreciated by those skilled in the art that the exemplary system architecture [100], the network entity [102], the access point [106], and the user equipment [104] of the present invention encompasses any number and varied types of the entities/elements such the network entity [102] with the cellular coverage range [110], the user equipments [104A-104C] present in the cellular coverage range [110], the access points [106A-106C], the WiFi coverage range [108], the units, interfaces, modules and components.

While considerable emphasis has been placed herein on the disclosed embodiments, it will be appreciated that many embodiments can be made and that many changes can be made to the embodiments without departing from the principles of the present invention. These and other changes in the embodiments of the present invention will be apparent to those skilled in the art, whereby it is to be understood that the foregoing descriptive matter to be implemented is illustrative and non-limiting.

What is claimed is:

1. A method for authenticating an access point, the method being performed by a network entity, the method comprising:
   receiving an authentication request for authenticating an access point (AP), from a user equipment, wherein
      the user equipment is in a connected state with said access point,
      the access point is, one of an authorized AP and a honeypot AP, connected with the user equipment,
      the authentication request comprises a UE identifier, an AP identifier, and at least one parameter, and
      the UE identifier corresponds to the user equipment and the AP identifier corresponds to one of the authorized AP and the honeypot AP;
   comparing the AP identifier with a pre-configured list of AP identifiers to generate one of a positive response and a negative response;
   transmitting one of a denial response and a verification request, wherein
      the denial response, to release/suspend the connection with the honeypot AP, is transmitted to the user equipment in an event the negative response is generated, and
      the verification request is transmitted to the authorized AP in an event the positive response is generated;
   receiving one of a positive verification response and a negative verification response from the authorized AP;
   transmitting one of a positive authentication response and a negative authentication response to the user equipment, wherein
      the positive authentication response is transmitted, to maintain the connection with the authorized AP, in response to the positive verification response received from the authorized AP, and
      the negative authentication response is transmitted, to release/suspend the connection with the honeypot AP, in response to the negative verification response received from the authorized AP.

2. The method as claimed in claim 1, wherein the authorized AP maintains the UE identifier and the at least one parameter in an event the authorized AP is connected with the user equipment.

3. The method as claimed in claim 1, wherein the at least one parameter comprises at least one of a probe request identifier, an authentication request identifier, an association request identifier and a temporary user equipment identifier.

4. The method as claimed in claim 1, wherein the positive response is generated in an event the AP identifier matches with the pre-configured list of AP identifiers.

5. The method as claimed in claim 1, wherein the negative response is generated in an event the AP identifier varies with the pre-configured list of AP identifiers.

6. The method as claimed in claim 1, wherein the verification request comprises the UE identifier, the AP identifier, and the at least one parameter.

7. The method as claimed in claim 1, wherein the positive verification response is received in an event the UE identifier and the at least one parameter maintained at the authorized AP matches with the UE identifier and the at least one parameter received with the verification request.

8. The method as claimed in claim 1, wherein the negative verification response is received in an event the UE identifier and the at least one parameter maintained at the authorized AP varies with the UE identifier and the at least one parameter received with the verification request.

9. A network entity for authenticating an access point, the network entity comprising:
   a cellular radio comprising a receiver module configured to:
      receive an authentication request for authenticating an access point (AP) from a user equipment, wherein
         the user equipment is in a connected state with said access point,
         the access point is, one of an authorized AP and a honeypot AP, connected with the user equipment,
         the authentication request comprises a UE identifier, an AP identifier, and at least one parameter, and
         the UE identifier corresponds to the user equipment and the AP identifier corresponds to one of the authorized AP and the honeypot AP;
   a processor comprising a collection of electronic circuits, the processor configured to compare the AP identifier with a pre-configured list of AP identifiers to generate one of a positive response and a negative response;
   a memory circuit, configured to store the pre-configured list of AP identifiers;
   the cellular radio comprising a transmitter module configured to:
      transmit one of a denial response to the user equipment and a verification request to the authorized AP, wherein
         the denial response is transmitted, to release/suspend the connection with the honeypot AP, in an event the negative response is generated, and
         the verification request is transmitted in an event the positive response is generated;
   the receiver module further configured to receive a positive verification response and a negative verification response from the authorized AP; and
   the transmitter module further configured to transmit one of a positive authentication response and a negative authentication response to the user equipment, wherein
      the positive authentication response is transmitted to maintain the connection with the authorized AP, and
      the negative authentication response is transmitted to release/suspend the connection with the honeypot AP.

10. The network entity as claimed in claim 9, wherein the processor further configured to generate one of the positive authentication response and the negative authentication response.

11. The network entity as claimed in claim 10, wherein the positive authentication response is generated in response to the positive verification response received from the authorized AP.

12. The network entity as claimed in claim 10, wherein the negative authentication response in response to the negative verification response received from the authorized AP.

* * * * *